Dec. 23, 1947.  M. G. HIMOFF  2,433,048
LATHE
Filed Dec. 26, 1944  3 Sheets-Sheet 1
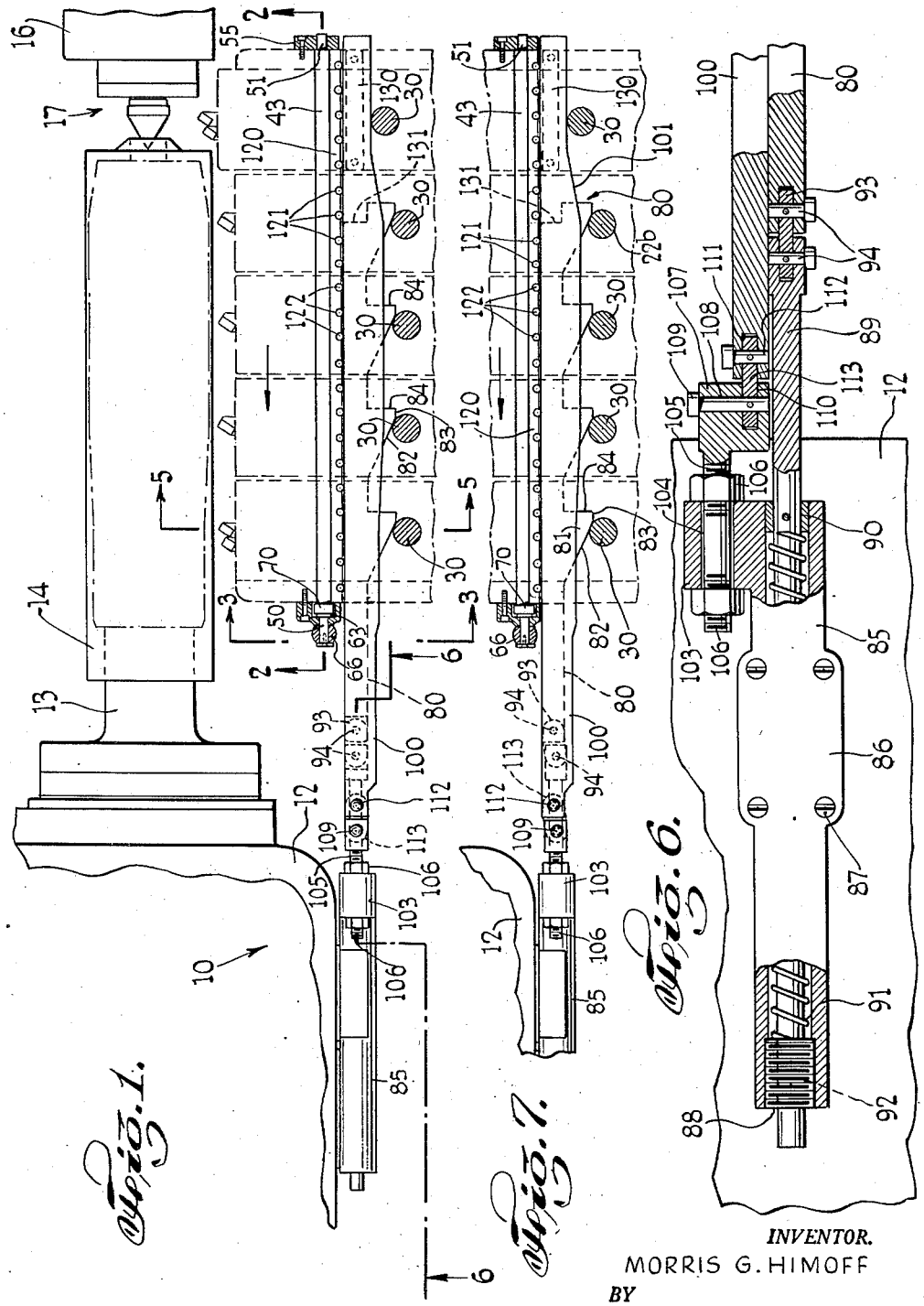
INVENTOR.
MORRIS G. HIMOFF
BY
J. B. Felshin
ATTORNEY Dec. 23, 1947.  M. G. HIMOFF  2,433,048
LATHE
Filed Dec. 26, 1944  3 Sheets-Sheet 2
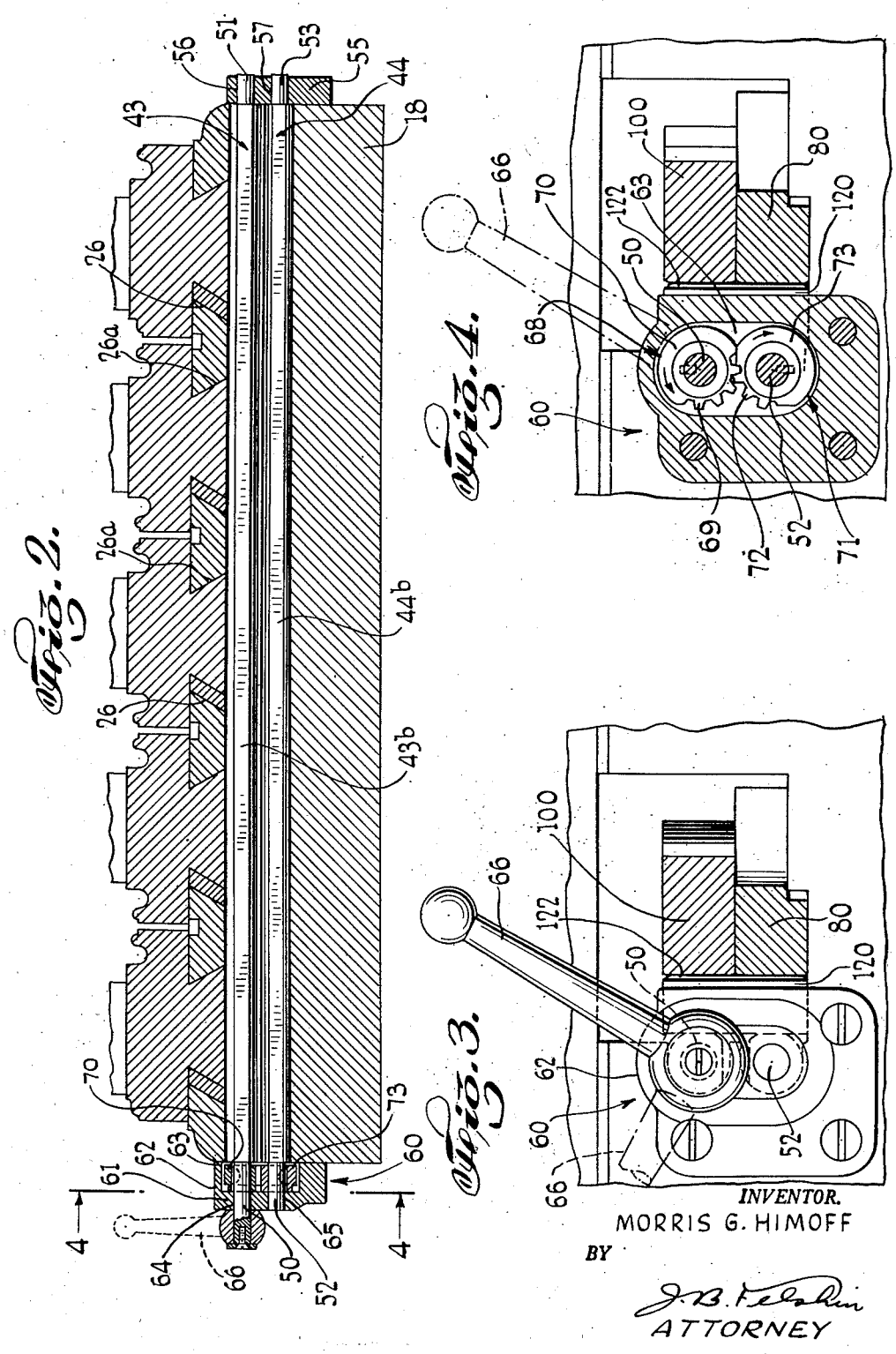
INVENTOR.
MORRIS G. HIMOFF
BY
*J. B. Felshin*
ATTORNEY Dec. 23, 1947.    M. G. HIMOFF    2,433,048
LATHE
Filed Dec. 26, 1944    3 Sheets-Sheet 3
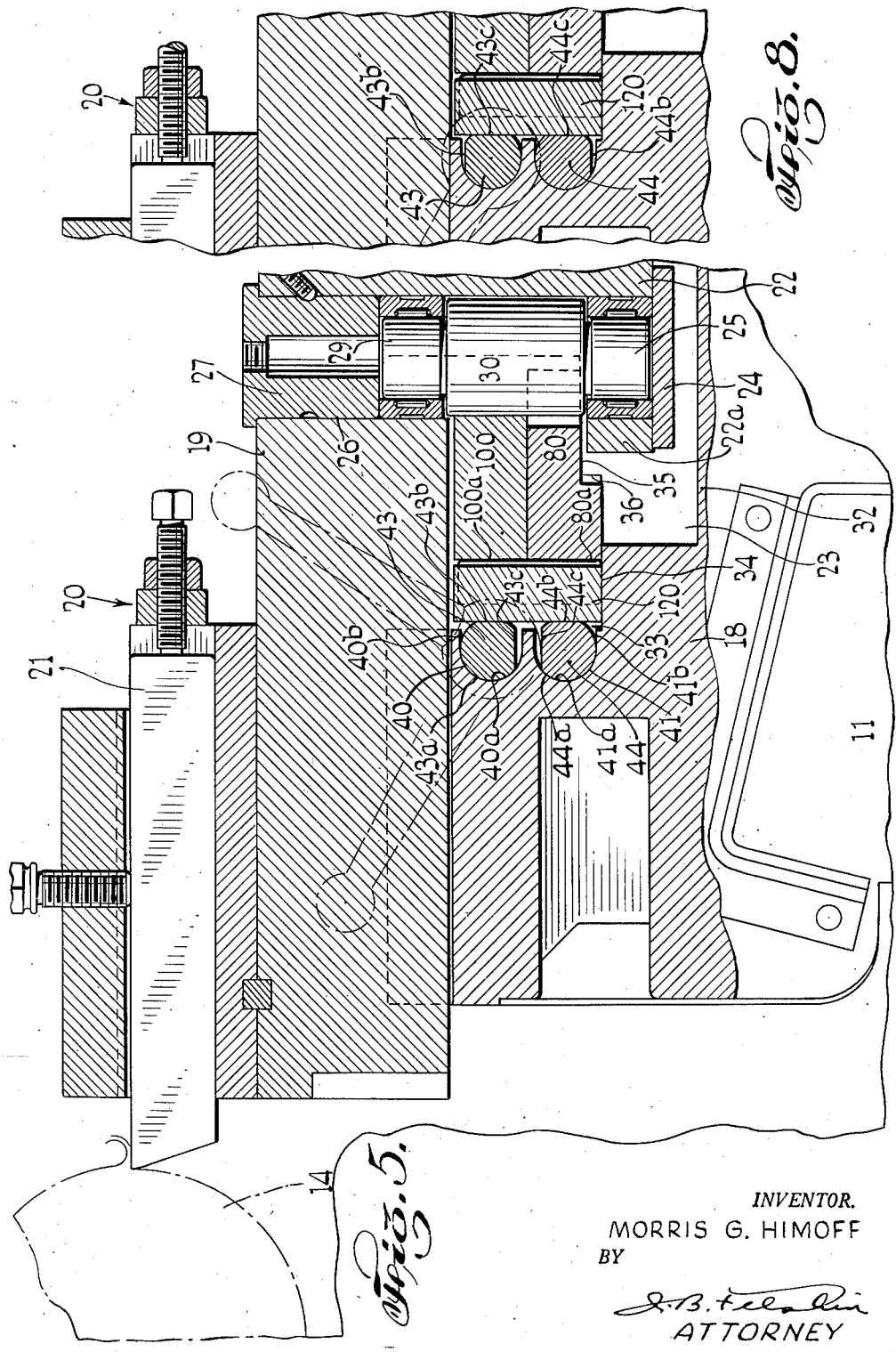
INVENTOR.
MORRIS G. HIMOFF
BY
*ATTORNEY*

Patented Dec. 23, 1947

2,433,048

UNITED STATES PATENT OFFICE 2,433,048

LATHE

Morris G. Himoff, New York, N. Y., assignor to Morey Machinery Co., Inc., New York, N. Y., a corporation of New York Application December 26, 1944, Serial No. 569,728

8 Claims. (Cl. 82—14)

1

This invention relates to lathes. It is particularly directed to an improvement in the lathe construction disclosed in co-pending application filed by Secondo L. Casella on December 26, 1944, for Lathes, and bearing Serial No. 569,695.

In lathes provided with means for form turning a piece of stock, it is desirable to take two cuts, first a rough cut, and then a fine cut. Difficulty has been experienced heretofore in adjusting the cutters from rough cut to fine cut. This is particularly true when a plurality of cutters are employed as each one has to be separately adjusted and it is often difficult and time-consuming to make an equal adjustment on all of the cutters. It is therefore an object of this invention to provide highly improved means for simultaneously and uniformly advancing all of the cutters from rough cut to fine cut.

Another object of this invention is to provide in a lathe of the character described, a form cam and an approach cam, means to retain said cams in position for rough cutting the stock, and means actuable upon turning a handle to permit movement of said cams exactly equal distances in a direction toward the stock, whereby to permit advance of the cutting tool holders a similar distance from rough cut position to fine cut position.

Another object of this invention is to provide in a lathe of the character described, a base, a carriage slidably movable thereon longitudinally of the base, a form cam fixed against movement longitudinally of the base, and an approach cam substantially co-extensive with the form cam, said carriage being movable relative to the approach cam and having means to move the approach cam therewith longitudinally of the base, and means to permit movement of the form and approach cams bodily relative to the base in a direction toward and away from a vertical plane passing through the axis of the lathe spindle.

Yet a further object of this invention is to provide a strong, rugged and durable mechanism of the character described which shall be relatively inexpensive to manufacture, which shall be smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

2

In the accompanying drawing, in which is shown various possible illustrative embodiments of this invention, Fig. 1 is a top plan view of a portion of a lathe embodying the invention;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 2;

Fig. 5 is a cross-sectional view taken on line 5—5 of Fig. 1;

Fig. 6 is a cross-sectional view taken on line 6—6 of Fig. 1;

Fig. 7 is a partial view similar to Fig. 1, but showing the parts in position for fine cut; and Fig. 8 is a partial view similar to Fig. 5, and showing the parts in position for fine cut.

Referring now in detail to the drawing, 10 designates a lathe embodying the invention. The same comprises a base 11 and a headstock 12 at one end of the base. Within the headstock is a usual spindle to rotate an expanding arbor 13 on which is mounted a piece of stock 14 to be turned. At the other end of the base is a tailstock 16 supporting a quill 17 engaging one end of the piece of stock 14.

Slidably mounted on the base for longitudinal movement relative thereto is a carriage 18 formed with a plurality of parallel recesses 23. Mounted on the carriage for sliding movement transversely of the direction of movement of the carriage are a plurality of parallel slides 19 each provided with a tool holder 20 clamping cutting tools 21 for turning the piece of stock 14.

Each slide 19 is provided with a downwardly extending arm 22 projecting into recess 23 in the carriage 18. At the lower end of each arm is a ring-shaped portion 22a. Attached to the lower end of each arm 22 is a cap 24. Within the ring 22a is a bearing 25. Slide 19 is formed with a vertical opening 26 aligned with ring 22a. Within the upper end of the opening 26 is a plug 27, fixed therein in any suitable manner. Within said opening and below the plug 27 is a bearing 29. The arm 22 has a semi-cylindrical groove 22b between ring 22a and opening 26 forming a continuation of said ring and opening. Within said semi-cylindrical groove 22b is a vertical roller 30.

The slide 19 is formed with walls 32 between the recesses 23. Said slide is formed with a longitudinal chamber 33 communicating with the recesses 23, and cutting through the walls 32 and adjacent portion of the slide to form a bottom horizontal wall 34 and a raised horizontal bottom wall 35. Between the walls or surfaces 34, 35 is a vertical shoulder 36. At the rear of chamber 33 are a pair of U-shaped parallel horizontal upper and lower bores 40 and 41 opening into chamber 33. The bores 40 and 41 have semi-cylindrical surfaces 40a and 41a, respectively. Extending from the surfaces 40a and 41a are horizontal surfaces 40b and 41b, respectively. Rotatably mounted in the bores 40 and 41 are a pair of parallel cam rods 43 and 44. The cam rod 43 has a part-cylindrical surface 43a journalled in the semi-cylindrical surface 40a of bore 40. It is also formed with a pair of flat surfaces 43b and 43c at right angles to each other and disposed parallel to the axis of the rod. Surface 43c however, is closer to the axis of the rod than surface 43b. The difference in distance between said surfaces 43c and 43b and the axis of the rod is equivalent to the distance the cutting tools are to be advanced from rough to fine cut.

The cam rod 44 also has a part-cylindrical surface 44a journalled within the semi-cylindrical surface 41a of bore 41. It is also formed with flat surfaces 44b and 44c at right angles to each other and parallel to the axis of the cam rod. Surface 44b is at the same distance from the axis of cam rod 44 as surface 43b is from the axis of cam rod 43. Surface 44c is at the same distance from the axis of cam rod 44 as surface 43c is from the axis of cam rod 43.

Looking at Fig. 5, it will be noted that in one position of the machine, the surfaces 43b and 44b are in vertical alignment. Also the surface 43c is at the bottom of cam rod 43, whereas surface 44c is at the top of cam rod 44. At the ends of cam rod 43 are axles 50 and 51. At the ends of cam rod 44 are axles 52 and 53. The axles are co-axial with their respective cam rods. It will be noted that axle 50 is longer than axle 51. Fixed to one end of the carriage 18 is a bearing plate 55 formed with bearing openings 56 and 57 to journal the axles 51 and 53. Fixed to the opposite end of carriage 18 is a housing member 60 having an outer wall 61 and a flange 62 extending therefrom forming a chamber 63 opening toward the carriage. The housing 60 may be fixed to the carriage in any suitable manner. Wall 61 is formed with bearing openings 64 and 65 in which are journalled axles 50 and 52, respectively. Said axles pass through the chamber 63. Axle 50 passes beyond the housing 60 and fixed thereto is a handle 66 for oscillating cam rod 43. Fixed onto axle 50 is a segmental gear 68 having gear teeth 69 and a solid or uncut portion 70. Fixed on axle 52 is a gear 71 having gear teeth 72 meshing with gear teeth 69, and also provided with a solid or uncut portion 73. The gears 68 and 71 are located within chamber 63 and are keyed to the axles therein. It will be noted that when the handle 66 is rotated in one direction the cam rods 43 and 44 will be rotated in opposite directions. The gear teeth on the two gears extend only one-quarter of the way around so as to permit the rods to be rotated 90°. With such construction the cam rods 43, 44 may be rotated from the position shown in Fig. 5 which is the "rough cut" position, to the position shown in Fig. 8 which is the "fine cut" position. When the cam rod 43 is rotated in a counter-clockwise direction through an angle of 90°, cam rod 44 will be rotated in a clockwise direction through an angle of 90° In the position of Fig. 8, the surfaces 43c and 44c will be in vertical alignment. The surface 43b will be at the top of cam rod 43 whereas surface 44b will be at the bottom of cam rod 44.

On the bottom wall 34 and extending through chamber 33 is an approach cam 80. The approach cam 80 has forwardly projecting lugs 81 resting on bottom wall 35. Each lug 81 is formed with a surface 82 inclined toward the axis of the lathe and toward the headstock, and with a rear edge surface 83 extending longitudinally of the axis of the lathe, and also with a surface 84 at right angles to the axis of the lathe. The cam lugs 81 are engaged by the rollers 30 on the slides. Thus each roller engages one of the cam lugs 81.

Fixed to one side of the headstock 12 is a tubular member 85. Member 85 may be provided with an itegral flange 86 formed with openings to receive screws 87 for attaching the tube in horizontal position to the headstock. Tube 85 is at the level of the approach cam 80. Screwed into one end of the tube is a plug 88. Slidably extending through the tube is a rod 89. Fixed to the rod 89 is a collar 90 disposed within the tube. Interposed between collar 90 and the plug 88 is a coil compression spring 91. The rod 89 slidably passes through an axial opening 92 in the plug 88. The adjacent ends of rod 89 and approach cam 80 are interconnected by a link 93. Said adjacent ends are formed with horizontal end slots to receive opposite ends of the link. The ends of the link are attached to the rod and approach cam by means of parallel pivot pins 94. The link 93 is in a horizontal plane whereas the pivot pins 94 are vertically disposed. With such construction the approach cam may be moved forwardly and rearwardly relative to a vertical plane passing through the axis of the lathe spindle or arbor.

Lying on the approach cam 80 is a form cam 100. The form cam 100 has a cam edge 101 similar to the contour of the finished piece of stock. The form and approach cams have straight rear edges 100a and 80a, respectively, as shown in Fig. 5 of the drawing. Extending upwardly from tube 85 is a projection 103 formed with a horizontal longitudinal through opening 104. Extending through the opening 104 is a stud 105 receiving nuts 106 adapted to be tightened against opposite ends of the lug 103. Integrally formed with the stud 105 is a block 107 formed with a vertical through opening 108. Extending through the opening 108 is a pivot 109. The block 107 is formed with a horizontal slot 110. The form cam 100 is formed on one end thereof with a horizontal slot 111 aligned with slot 110. Traversing the slot 111 is a vertical pivot pin 112. Interconnecting the pivot pins 109 and 112 is a horizontal link 113 projecting into slots 110, 111. The form cam is thus anchored by the link and retained against longitudinal movement. It may have a slight movement forward and rearwardly relative to a vertical plane passing through the axis of the arbor 13.

Interposed between cams 80 and 100 and the cam rods 43, 44 is a longitudinally extending roller plate 120, fixed to the carriage 18 by screws or in any other suitable manner. The roller plate 120 has its lower edge resting on bottom surface 34. As shown in Fig. 5 the rear surface of the roller plate contacts surfaces 43b and 44b of the cam rods 43 and 44. The roller plate is formed with a plurality of parallel, aligned, vertical drilled openings 121 communicating with the front surfaces of the roller plate. Within the openings 121 are vertical roller pins 122 which project forward beyond the roller plate and contact the rear edges 100a and 80a of the cams 100 and 80, respectively.

Any suitable hydraulic means may be employed for moving the slides 19 toward a vertical plane passing through the axis of the lathe and away therefrom.

The operation of the machine will now be explained:

When the slides are moved toward the stock, the rollers 30 will contact the inclined edges 82 of the cam projections 81 on the approach cam. As the carriage moves to the left toward the headstock, the rollers will ride onto the cam edge 101 of the form cam and the cutting tools will begin to cut the stock at an inclination. When the carriage begins to move, the approach cam is stationary. On the slide, however, is an abutment plate 130 which contacts an end edge 131 on the approach cam after the rollers have engaged the cam edge 101 so that further movement of the carriage will cause movement of the approach cam 80 therewith. During said movement of the approach cam to the left, the coil compression spring 91 in tube 85 is compressed. When the carriage moves back, the spring will return the approach cam to its normal position.

When the rough cut is made the cam rods 43, 44 are in the position shown in Fig. 5. After the rough cut is made the handle 66 is moved in a counter-clockwise direction, looking at Fig. 5 of the drawing, to bring the cam rods to the position shown in Fig. 8 and permit the roller plate as well as the approach and form cams to move closer toward a vertical plane passing through the axis of the arbor by a distance equivalent to the advance of the cutting tools from rough to fine cut. This distance of course, is equivalent to the difference in the distance the surfaces 43b and 44b are from the axes of the cam rods and the distance surfaces 43c and 44c are from said axes. Thus, if surfaces 43b and 44b are one-eighth of an inch further away from the axes of the cam rods than are surfaces 43c and 44c, the cutting tools will be permitted to be advanced one-eighth of an inch upon rotating the handle 66. When the handle is rotated in a clockwise direction, the cam rods are moved from the position of Fig. 8 to the position of Fig. 5 so that a rough cut can be made on the next piece of stock. As stated above, the link connections 93 and 113 permit movement of the approach cam and form cam bodily for change from rough cut to fine cut, and vice-versa.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a lathe, a base having a longitudinal bed, a carriage slidably movable thereon, a plurality of slides slidably mounted on the carriage for movement at right angles to the direction of movement of the carriage, a form cam and an approach cam, means on the slides to engage said cams, tool holders on said slides, and means to simultaneously move said cams in the direction of movement of the slides the same predetermined distance said means comprising a pair of parallel elongated members mounted for rotation on said carriage and disposed parallel to and aligned with said cams, said members each having a pair of flat surfaces parallel to the axis thereof and at different distances therefrom, one flat surface on one member being the same distance from the axis thereof as its complementary flat surface of the other member is from the axis of said other member and the other flat surface of said first mentioned member being the same distance from the axis of said first mentioned member, as its complementary flat surface of said other member is from the axis of said other member.

2. In a lathe, a base having a longitudinal bed, a carriage slidably movable thereon, a plurality of slides slidably mounted on the carriage for movement at right angles to the direction of movement of the slide, a form cam and an approach cam, means on the slides to engage said cams, tool holders on said slides, means to move said cams in the direction of movement of the slides a predetermined distance, said means comprising a pair of parallel cam rods journalled in said carriage and intermeshing gears on said cam rods, a handle on one of said cam rods, and said cam rods each having a pair of surfaces parallel to the axis thereof and at different distances therefrom, the pair of surfaces on one cam rod being the same distance from the axis thereof as the pair of surfaces of the other cam rod are from the axis of said other cam rod.

3. In a lathe having a longitudinal bed, a carriage slidably mounted thereon, a plurality of parallel tool holders slidably mounted on the carriage for movement in a direction transversely of the direction of movement of the carriage, a form cam extending longitudinally of the carriage, means on the tool holders to engage the form cam, a member fixed relative to the base, a link interconnecting the form cam and member, an approach cam extending longitudinally of said carriage, and having means to control the approach of said contact means on the tool holders relative to said form cam, a member slidably mounted relative to said base, spring means to urge said second member in one direction, a link interconnecting said second member with said approach cam, and means to simultaneously move said form cam and approach cam equal distance in the direction of movement of said tool holders on said carriage.

4. In a lathe, a base, a carriage slidably mounted on said base for movement longitudinally thereof, a plurality of parallel tool holders slidably mounted on said carriage for movement at right angles to the direction of movement of the carriage, each tool holder being provided with a vertical roller, an approach cam mounted on said carriage, a form cam mounted on said approach cam and extending longitudinally thereof, said cams extending longitudinally of the direction of movement of said carriage and adapted to be contacted by the rollers on said tool holders, a pair of longitudinal cam rods mounted for rotation on said carriage about parallel axes, and means on said cam rods for moving the form and approach cams bodily in the direction of movement of the tool holders upon rotating said cam rods.

5. In a lathe, a base, a carriage slidably mounted on said base for movement longitudinally thereof, a plurality of parallel tool holders slidably mounted on said carriage for movement at right angles to the direction of movement of the carriage, each tool holder being provided with a vertical roller, an approach cam mounted on said carriage, a form cam mounted on said approach cam and extending longitudinally thereof, said cams extending longitudinally of the direction of movement of said carriage and adapted to be contacted by the rollers on said tool holders, a pair of longitudinal cam rods mounted for rotation on said carriage about parallel axes, means on said cam rods for moving the form and approach cams bodily in the direction of movement of the tool holders upon rotating said cam rods, intermeshing gears on said cam rods, and a handle on one of said cam rods.

6. In a lathe, a base, a carriage slidably mounted on said base for movement longitudinally thereof, a plurality of parallel tool holders slidably mounted on said carriage for movement at right angles to the direction of movement of the carriage, each tool holder being provided with a vertical roller, an approach cam mounted on said carriage, a form cam mounted on said approach cam and extending longitudinally thereof, said cams extending longitudinally of the direction of movement of said carriage and adapted to be contacted by the rollers on said tool holders, a pair of longitudinal cam rods mounted for rotation on said carriage about parallel axes, means on said cam rods for moving the form and approach cams bodily in the direction of movement of the tool holders upon rotating said cam rods, intermeshing gears on said cam rods, a handle on one of said cam rods, a member fixed relative to said base, and a link connecting said member and form cam to anchor the form cam to the base against longitudinal movement.

7. In a lathe, a base, a carriage slidably mounten on said base for movement longitudinally thereof, a plurality of parallel tool holders slidably mounted on said carriage for movement at right angles to the direction of movement of the carriage, each tool holder being provided with a vertical roller, an approach cam mounted on said carriage, a form cam mounted on said approach cam and extending longitudinally thereof, said cams extending longitudinally of the direction of movement of said carriage and adapted to be contacted by the rollers on said tool holders, a pair of longitudinal cam rods mounted for rotation on said carriage about parallel axes, means on said cam rods for moving the form and approach cams bodily in the direction of movement of the tool holders upon rotating said cam rods, intermeshing gears on said cam rods, a handle on one of said cam rods, a member fixed relative to said base, a link connecting said member and form cam to anchor the form cam to the base against longitudinal movement, a spring pressed member slidably mounted relative to said base, and a link connecting said spring pressed member to said approach cam.

8. In a lathe, a base, a carriage slidably mounted on said base for movement longitudinally thereof, a plurality of parallel tool holders slidably mounted on said carriage for movement at right angles to the direction of movement of the carriage, each tool holder being provided with a vertical roller, an approach cam mounted on said carriage, a form cam mounted on said approach cam and extending longitudinally thereof, said cams extending longitudinally of the direction of movement of said carriage and adapted to be contacted by the rollers on said tool holders, a pair of longitudinal cam rods mounted for rotation on said carriage about parallel axes, means on said cam rods for moving the form and approach cams bodily in the direction of movement of the tool holders upon rotating said cam rods, a roller plate interposed between the cam rods and said form and approach cams, and roller pins on said roller plate engaging said form and approach cams.

MORRIS G. HIMOFF.

REFERENCES CITED

The following references are of record in the file of this patent:

UNITED STATES PATENTS

| Number | Name | Date |
|---|---|---|
| 1,195,293 | Townsend | Aug. 22, 1916 |
| 1,199,312 | Sparks | Sept. 26, 1916 |
| 2,002,933 | Buell | May 28, 1935 |

FOREIGN PATENTS

| Number | Country | Date |
|---|---|---|
| 481,831 | Great Britain | Mar. 18, 1938 |
| 541,800 | Great Britain | Dec. 11, 1941 |